United States Patent [19]

Chirillo et al.

[11] Patent Number: 4,855,370

[45] Date of Patent: Aug. 8, 1989

[54] METHOD FOR REDUCING SHEETING DURING POLYMERIZATION OF ALPHA-OLEFINS

[75] Inventors: John R. Chirillo, Victoria; Kellam C. Kimbrough II, Inez; Peder E. McHattie, Victoria, all of Tex.

[73] Assignee: Union Carbide Corporation, Danbury, Conn.

[21] Appl. No.: 914,443

[22] Filed: Oct. 1, 1986

[51] Int. Cl.$^4$ ............................ C08F 2/34; C08F 10/00
[52] U.S. Cl. ...................................... 526/74; 526/138; 526/901
[58] Field of Search ......................................... 526/74

[56] References Cited

U.S. PATENT DOCUMENTS

| | | | |
|---|---|---|---|
| 3,177,184 | 4/1965 | Cottle | 526/84 |
| 3,708,465 | 1/1973 | Slietrich et al. | 526/84 |
| 4,130,699 | 12/1978 | Hoff et al. | 526/84 |
| 4,532,311 | 7/1985 | Fulks et al. | 526/74 |

FOREIGN PATENT DOCUMENTS

| | | | |
|---|---|---|---|
| 5215 | 1/1979 | European Pat. Off. | |
| 8799 | 3/1980 | European Pat. Off. | |
| 136029 | 4/1985 | European Pat. Off. | 526/84 |
| 56-4608 | 1/1981 | Japan | |
| 856815 | 12/1960 | United Kingdom | 526/138 |

OTHER PUBLICATIONS

Boland et al., Electrostatic Charging in Gas Fluidized Beds, *Powder Technology*, 5 (1971–72).
"Reduction of Particle Agglomeration in a Fluidizing Gas Stream in the Presence of a Radiofrequency Glow Discharge", I&EG Fund (1980), 19, 315–316.
Geldart et al., "Static Electrification in Fluidised Beds" Chem. Eng. Sci. 1969, vol. 24, pp. 1389–1390.
Pohl H. A.; "Nonuniform Field Effects: Dielectrophoresis" Chapter 14, Electrostatics and its Applications, Moore, Wiley Pub. (1973) pp. 336–338.
Masuda et al. "Electrification of Gas Solid Suspension Flowing in Steel and Insulating-Cooled Pipes, Journal of Electrostatics", 2 (1976/77) pages 341–350.

*Primary Examiner*—Edward J. Smith
*Attorney, Agent, or Firm*—Clement J. Vicari

[57] ABSTRACT

A method for reducing sheeting during polymerization of alpha-olefins in a low pressure fluidized bed reactor utilizing titanium or vanadium based compounds as catalysts together with alkyl aluminum cocatalysts wherein water is introduced water into said reactor in an amount sufficient to maintain the electrostatic levels at the site of possible sheet formation at levels which avoid sheeting without substantially altering the effectiveness of said catalysts.

22 Claims, 1 Drawing Sheet

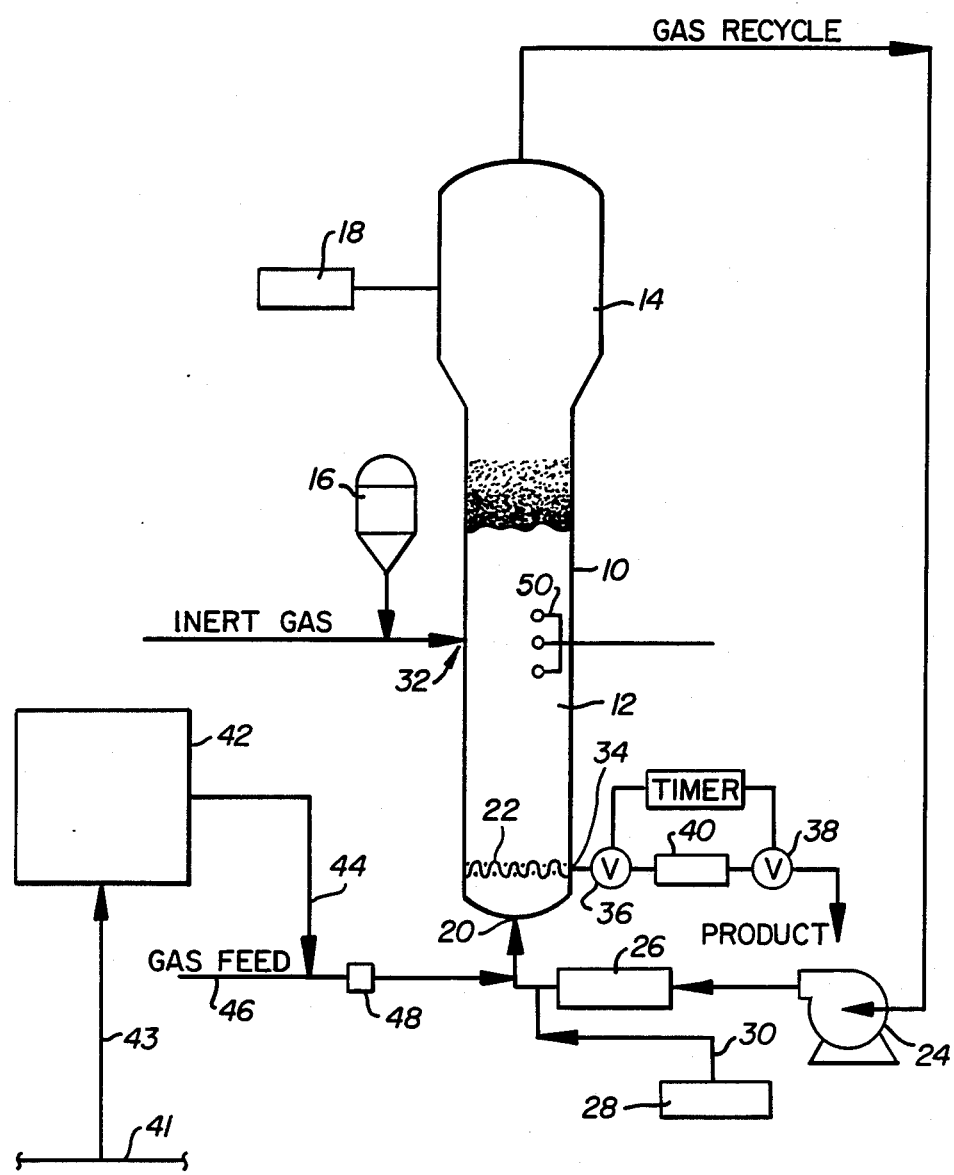

METHOD FOR REDUCING SHEETING DURING POLYMERIZATION OF ALPHA-OLEFINS

BACKGROUND OF THE INVENTION

1. Field of the Invention

This invention relates to a method for reducing sheeting during polymerization of alpha-olefins and more particularly to a method for reducing sheeting during polymerization of polyethylene utilizing titanium based catalysts or vanadium based catalysts with alkyl aluminum cocatalysts.

2. Summary of the Prior Art

Conventional low density polyethylene has been historically polymerized in heavy walled autoclaves or tubular reactors at pressures as high as 50,000 psi and temperatures up to 300° C. or higher. The molecular structure of high pressure, low density polyethylene (HP-LDPE) is high complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

More recently, technology has been provided whereby low density polyethylene can be produced by fluidized bed techniques at low pressures and temperatures by copolymerizing ethylene with various alpha-olefins. These low pressure LDPE (LP-LDPE) resins generally possess little, if any, long chain branching and are sometimes referred to as linear LDPE resins. They are short chain branched with branch length and frequency controlled by the type and amount of comonomer used during polymerization.

As is well known to those skilled in the art, low pressure, high or low density polyethylenes can now be conventionally provided by a fluidized bed process utilizing several families of catalysts to produce a full range of low density and high density products. The appropriate selection of catalysts to be utilized depends in part upon the type of end product desired, i.e., high density, low density, extrusion grade, film grade resins and other criteria.

The various types of catalysts which may be used to produce polyethylenes in fluid bed reactors can generally be typed as follows:

Type I

The silyl chromate catalysts disclosed in U.S. Pat. No. 3,324,101 to Baker and Carrick and U.S. Pat. No. 3,324,095 to Carrick, Karapinks and Turbet. The silyl chromate catalysts are characterized by the presence therein of a group of the formula:

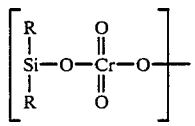

wherein R is a hydrocarbyl group having from 1 to 14 carbon atoms. The preferred silyl chromate catalysts are the bis(triarylsilyl) chromates and more preferably bis(triphenylsilyl) chromate.

This catalyst is used on a support such as silica, alumina, thoria, zirconia and the like, other supports such as carbon black, micro-crystalline cellulose, the non-sulfonated ion exchange resins and the like may be used.

Type II

The bis(cyclopentadienyl) chromium (II) compounds disclosed in U.S. Pat. No. 3,879,368. These bis(cyclopentadienyl) chromium (II) compounds have the following formula:

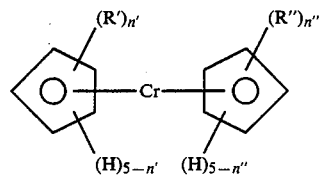

wherein R' and R" may be the same or different $C_1$ to $C_{20}$, inclusive, hydrocarbon radicals, and n' and n" may be the same or different integers of 0 to 5, inclusive. The R' and R" hydrocarbon radicals may be saturated or unsaturated, and can include aliphatic, alicyclic and aromatic radicals such as methyl, ethyl, propyl, butyl, pentyl, cyclopentyl, cyclohexyl, allyl, phenyl and naphthyl radicals.

These catalysts are used on a support as heretofore described.

Type III

The catalysts as described in U.S. Pat. No. 4,011,382. These catalysts contain chromium and titanium in the form of oxides and, optionally, fluorine and a support. The catalysts contain, based on the combined weight of the support and the chromium, titanium and fluorine, about 0.05 to 3.0, and preferably about 0.2 to 1.0, weight percent of chromium (calculated as Cr), about 1.5 to 9.0, and preferably about 4.0 to 7.0, weight percent of titanium (calculated as Ti), and 0.0 to about 2.5, and preferably about 0.1 to 1.0 weight percent of fluorine (calculated as F).

The chromium compounds which may be used for the Type III catalysts include $CrO_3$, or any compound of chromium which is oxidizable to $CrO_3$ under the activation conditions employed. At least a portion of the chromium in the supported, activated catalyst must be in the hexavalent state. Chromium compounds other than $CrO_3$ which may be used are disclosed in U.S. Pat. No. 2,825,721 and U.S. Pat. No. 3,622,521 and include chromic acetyl acetonate, chromic nitrate, chromic acetate, chromic chloride, chromic sulfate, and ammonium chromate.

The titanium compounds which may be used include all those which are oxidizable to $TiO_2$ under the activation conditions employed, and include those disclosed in U.S. Pat. No. 3,622,521 and Netherlands Patent Application No. 72-10881.

The fluorine compounds which may be used include HF, or any compound of fluorine which will yield HF under the activation conditions employed. Fluorine compounds other than HF which may be used are disclosed in Netherlands Patent Application No. 72-10881.

The inorganic oxide materials which may be used as a support in the catalyst compositions are porous materials having a high surface area, that is, a surface area in the range of about 50 to 1000 square meters per gram, and an average particle size of about 20 to 200 microns.

The inorganic oxides which may be used include silica, alumina, thoria, zirconia and other comparable inorganic oxides, as well as mixtures of such oxides.

Type IV

The catalysts as described in U.S. Pat. No. 4,302,566 in the names of F. J. Karol et al, and entitled, "Preparation of Ethylene Copolymers in Fluid Bed Reactor" and assigned to the same assignee as the present application. These catalysts comprise at least one titanium compound, at least one magnesium compound, at least one electron donor compound, at least one activator compound and at least one inert carrier material.

The titanium compound has the structure $$Ti(OR)_a X_b$$

wherein R is a $C_1$ to $C_{14}$ aliphatic or aromatic hydrocarbon radical, or COR' where R' is a $C_1$ to $C_{14}$ aliphatic or aromatic hydrocarbon radical; X is Cl, Br, or I; a is 0 or 1; b is 2 to 4 inclusive; and a+b=3 or 4.

The titanium compounds can be used individually or in combination thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure:

$$MgX_2$$

wherein X is Cl, Br, or I. Such magnesium compounds can be used individually or in combinations thereof and would include $MgCl_2$, $MgBr_2$ and $MgI_2$. Anhydrous $MgCl_2$ is the preferred magnesium compound.

The titanium compound and the magnesium compound are generally used in a form which will facilitate their dissolution in the electron donor compound.

The electron donor compound is an organic compound which is liquid at 25° C. and in which the titanium compound and the magnesium compound are partially or completely soluble. The electron donor compounds are known as such or as Lewis bases.

The electron donor compounds would include such compounds as alkyl esters of aliphatic and aromatic carboxylic acids, aliphatic ethers, cyclic ethers and aliphatic ketones.

The catalyst may be modified with a boron halide compound having the structure:

$$BR_c X'_{3-c}$$

wherein R is an aliphatic or aromatic hydrocarbon radical containing from 1 to 14 carbon atoms or OR', wherein R' is also an aliphatic or aromatic hydrocarbon radical containing from 1 to 14 carbon atoms; X' is selected from the group consisting of Cl and Br, or mixtures thereof, and; c is 0 or 1 when R is an aliphatic or aromatic hydrocarbon and 0, 1 or 2 when R is OR'.

The boron halide compounds can be used individually or in combination thereof, and would include $BCl_3$, $BBr_3$, $B(C_2H_5)Cl_2$, $B(OC_2H_5)Cl_2$, $B(OC_2H_5)_2Cl$, $B(C_6H_5)Cl_2$, $B(OC_6H_5)Cl_2$, $B(C_6H_{13})Cl_2$, $B(OC_6H_{13})Cl_2$, and $B(OC_6H_5)_2Cl$. Boron trichloride is the particularly preferred boron compound.

The activator compound has the structure:

$$Al(R'')_c X'_d H_e$$

wherein X' is Cl or $OR_1$; $R_1$ and R'' are the same or different and are $C_1$ to $C_{14}$ saturated hydrocarbon radicals, d is 0 to 1.5, e is 1 or 0, and c+d+e=3.

Such activator compounds can be used individually or in combinations thereof.

The carrier materials are solid, particulate materials and would include inorganic materials such as oxides of silicon and aluminum and molecular sieves, and organic materials such as olefin polymers, e.g., polyethylene.

Type V

Vanadium based catalysts. These type catalysts generally include vanadium as the active ingredient, one such type catalyst generally comprises a supported precursor, a cocatalyst and a promoter. The supported precursor consists essentially of a vanadium compound and modifier impregnated on a solid, inert carrier. The vanadium compound in the precursor is the reaction product of a vanadium trihalide and an electron donor. The halogen in the vanadium trihalide is chlorine, bromine or iodine, or mixtures thereof. A particularly preferred vanadium trihalide is vanadium trichloride, $VCl_3$.

The electron donor is a liquid, organic Lewis base in which the vanadium trihalide is soluble. The electron donor is selected from the group consisting of alkyl esters of aliphatic and aromatic carboxylic acids, aliphatic esters, aliphatic ketones, aliphatic amines, aliphatic alcohols, alkyl and cycloalkyl ethers, and mixtures thereof. Preferred electron donors are alkyl and cycloalkyl ethers, including particularly tetrahydrofuran. Between about 1 to about 20, perferably between about 1 to about 10, and most preferably about 3 moles of the electron donor are complexed with each mole of vanadium used.

The modifier used in the precursor has the formula:

$$MX_a$$

wherein:

M is either boron or $AlR_{(3-a)}$ and wherein each R is independently alkyl, provided that the total number of aliphatic carbon atoms in any one R group may not exceed 14;

X is chlorine, bromine or iodine; and a is 0, 1 or 2, with the provision that when M is boron a is 3.

Preferred modifiers include $C_1$ to $C_6$ alkyl aluminum mono- and di- chlorides and boron trichloride. A particularly preferred modifier is diethyl aluminum chloride. About 0.1 to about 10, and preferably about 0.2 to about 2.5, moles of modifier are used per mole of electron donor.

The carrier is a solid, particulate porous material inert to the polymerization. The carrier consists essentially of silica or alumina, i.e., oxides of silicon or aluminum or mixtures thereof.

Optionally, the carrier may contain additional materials such as zirconia, thoria or other compounds chemically inert to the polymerization or mixtures thereof.

The carrier is used as a dry powder having an average particle size of between about 10 to about 250, preferably about 20 to about 200, and most preferably about 30 to about 100, microns. The porous carrier has a surface area of greater than or equal to about 3, and preferably greater than or equal to about 50, $m^2/g$. A preferred carrier is silica having pore sizes of greater than or equal to about 80, and preferably greater than or equal to about 100, angstroms. The carrier is predried by heating to remove water, preferably at a temperature of greater than or equal to about 600° C.

The amount of carrier used is that which will provide a vanadium content of between about 0.05 to about 0.5 mmoles of vanadium per gram (mmole V/g), and preferably between about 0.2 to about 0.35 mmole V/g, and most preferably about 0.29 mmole V/g.

The carrier is ordinarily free of preparative chemical treatment by reaction with an alkylaluminum compound prior to the formation of the supported precursor. Such treatment results in the formation of aluminum alkoxides chemically bonded to the carrier molecules. It has been discovered that the use of such a treated carrier in the catalyst composition and process is not only nonessential, but instead results in undesirable agglomeration when used in the preparation of high density polyethylene (>0.94 g/cc), resulting in a chunk-like, non-freely flowing product.

The cocatalyst which can be employed for the Type IV and Type V catalysts has the formula:

$$AlR_3$$

wherein R is as previously defined in the definition of M. Preferred cocatalysts include $C_2$ to $C_8$ trialkylaluminum compounds. A particularly preferred cocatalyst is triisobutyl aluminum. Between about 5 to about 500, and preferably between about 10 to about 50, moles of cocatalyst are used per mole of vanadium.

The promoter has the formula:

$$R'_b CX'_{(4-b)}$$

wherein:
R' is hydrogen or unsubstituted or halosubstituted lower, i.e., up to about $C_6$ containing, alkyl;
X' is halogen; and
b is 0, 1 or 2.

Between about 0.1 to about 10, and preferably between about 0.2 to about 2, moles of promoter are used per mole of cocatalyst.

The catalyst is produced by first preparing the supported precursor. In one embodiment, the vanadium compound is prepared by dissolving the vanadium trihalide in the electron donor at a temperature between about 20° C. up to the boiling point of the electron donor for a few hours. Preferably, mixing occurs at about 65° C. for about 3 hours or more. The vanadium compound so produced is then impregnated onto the carrier. Impregnation may be effected by adding the carrier as a dry powder or as a slurry in the electron donor or other inert solvent. The liquid is removed by drying at less than about 100° C. for a few hours, preferably between about 45° to about 90° C. for about 3 to 6 hours. The modifier, dissolved in an inert solvent, such as a hydrocarbon, is then mixed with the vanadium impregnated carrier. The liquid is removed by drying at temperatures of less than about 70° C. for a few hours, preferably between about 45° to about 65° C. for about 3 hours.

The cocatalyst and promoter are added to the supported precursor either before and/or during the polymerization reaction. The cocatalyst and promoter are added either together or separately, and either simultaneously or sequentially during polymerization. The cocatalyst and promoter are preferably added separately as solutions in inert solvent, such as isopentane, during polymerization.

In general, the above catalysts are introduced together with the polymerizable materials, into a reactor having an expanded section above a straight-sided section. Cycle gas enters the bottom of the reactor and passes upward through a gas distributor plate into a fluidized bed located in the straight-sided section of the vessel. The gas distributor plate serves to ensure proper gas distribution and to support the resin bed when gas flow is stopped.

Gas leaving the fluidized bed entrains resin particles. Most of these particles are disengaged as the gas passes through the expanded section where its velocity is reduced.

In order to satisfy certain end use applications for ethylene resins, such as for film, injection molding and roto-molding applications, catalyst Types IV and V with alkyl aluminum cocatalysts have been used. However, attempts to produce certain ethylene resins utilizing alkyl aluminum cocatalysts with the Type IV and V catalysts supported on a porous silica substrate in certain fluid bed reactors, have not been entirely satisfactory from a practical commercial standpoint. This is primarily due to the formation of "sheets" in the reactor after a period of operation. The "sheets" can be characterized as constituting a fused polymeric material.

It has been found that a static mechanism is a contributor to the sheeting phenomena whereby catalyst and resin particles adhere to the reactor walls due to static forces. If allowed to reside long enough under a reactive environment, excess temperatures can result in particle fusion. Numerous causes for static charge exist. Among them are generation due to frictional electrification of dissimilar materials, limited static dissipation, introduction to the process of minute quantities of prostatic agents, excessive catalyst activities, etc. Strong correlation exists between sheeting and the presence of excess static charges either negative or positive. This is evidenced by sudden changes in static levels followed closely by deviation in temperatures at the reactor wall. These temperature deviations are either high or low. Low temperatures indicate particle adhesion causing an insulating effect from the bed temperature. High deviations indicate reaction taking place in zones of limited heat transfer. Following this, disruption in fluidization patterns is generally evident, catalyst feed interruption can occur, product discharge system pluggage results, and thin fused agglomerates (sheets) are noticed in the granular product.

The sheets vary widely in size, but are similar in most respects. They are usually about ¼ to ½ inch thick and are from about one to five feet long, with a few specimens even longer. They have a width of about 3 inches to more than 18 inches. The sheets have a core composed of fused polymer which is oriented in the long direction of the sheets and their surfaces are covered with granular resin which has fused to the core. The edges of the sheets can have a hairy appearance from strands of fused polymer.

It is therefore an object of the present invention to provide a method for substantially reducing or eliminating the amount of sheeting which occurs during the low pressure fluidized bed polymerization of alpha-olefins utilizing titanium based compounds or vanadium based compounds as catalyst with alkyl aluminum as cocatalysts.

Another object is to provide a process for reducing sheeting in fluidized bed reactors utilized for the production of polyolefin resins wherein titanium or vanadium based catalysts with alkyl aluminum cocatalysts are employed.

These and other objects will become readily apparent from the following description taken in conjunction with the accompanying drawing which generally indicates a typical gas phase fluidized bed polymerization process for producing high density and low density polyolefins slightly modified to reflect the present invention.

Broadly contemplated, the present invention provides a method for reducing sheeting during polymerization of alpha-olefins in a low pressure fluidized bed reactor utilizing titanium or vanadium based compounds as catalysts together with alkyl aluminum cocatalysts which comprises introducing water into said reactor in an amount sufficient to maintain the electrostatic levels at the site of possible sheet formation at levels which avoid sheeting without substantially altering the effectiveness of said catalysts.

The drawing shows a gas phase fluidized-bed reactor system in which the present invention may be employed.

The amount of water which is fed to the reactor depends on the static voltage within the reactor and can generally range in an amount of 0.1 to about 2 ppm based on ethylene feed. In general, the nitrogen flow control is such as to permit a nitrogen flow of about 0 to about 11 lbs/hr for an ethylene feed range of about 0 to about 50,000 lb/hr. The water cylinder temperature in the O'Brien box can generally be in a range of about 10° C. to about 40° C. Nitrogen pressures can generally range from about 200 to 400 psig preferably about 320 to about 370 psig.

The critical static voltage level for sheet formation is a complex function of resin sintering temperature, operating temperature, drag forces in the fluid bed, resin particle size distribution and recycle gas composition. The static voltage can be reduced by a variety of techniques such as by treating the reactor surface to reduce static electric generation by injection of an antistatic agent to increase particle surface electrical conductivity thus promoting particle discharging; by installation of appropriate devices connected to the reactor walls which are designed to promote electrical discharging by creating areas of high localized field strength, and by neutralization of charges by the injection or creation of ion pairs, ions or charged particles of the opposite polarity from the resin bed.

According to the present invention, the use of water add back to the gas phased low pressure polyethylene process will assist in the reduction of agglomerate formation in the fluidized bed. This is accomplished by a reduction in the levels of positive static voltage which lowers particle adhesive forces in the reaction system.

Referring particularly to the sole figure of the drawing, a conventional fluidized bed reaction system for polymerizing alpha-olefins slightly modified to provide for water add back, includes a reactor 10 which consists of a reaction zone 12 and a velocity reduction zone 14.

The reaction zone 12 includes a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed is normally maintained above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum gas flow required to achieve fluidization, C. Y. Wen and Y. H. Yu, "Mechanics of Fluidization", Chemical Engineering Progress Symposium Series, Vol. 62, pg. 100–111 (1966).

It is highly desirable that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The appropriate catalyst used in the fluidized bed is preferably stored for service in a reservoir 16 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up is fed to the bed at a rate equal to the rate at which particulate polymer product is withdrawn. The composition of the make-up gas is determined by a gas analyzer 18 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part or all of the make-up gas are returned to the reactor at base 20 below the bed. Gas distribution plate 22 positioned above the point of return ensures proper gas distribution and also supports the resin bed when gas flow is stopped.

The portion of the gas stream which does not react in the bed constitutes the recycle gas which is removed from the polymerization zone, preferably by passing it into velocity reduction zone 14 above the bed where entrained particles are given an opportunity to drop back into the bed.

The recycle gas is then compressed in a compressor 24 and thereafter passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially constant temperature under steady conditions. The recycle is then returned to the reactor at its base 20 and to the fluidized bed through distribution plate 22. The compressor 24 can also be placed downstream of heat exchanger 26.

Hydrogen may be used as a chain transfer agent for conventional polymerization reactions of the types contemplated herein. In the case where ethylene is used as a monomer the ratio of hydrogen/ethylene employed will vary between 0 to about 2.0 moles of hydrogen per mole of the monomer in the gas stream.

Any gas inert to the catalyst and reactants can also be present in the gas stream. The cocatalyst is added to the gas recycle stream upstream of its connection with the reactor as from dispenser 28 through line 30.

As is well known, it is essential to operate the fluid bed reactor at a temperature below the sintering temperature of the polymer particles. Thus to insure that sintering will not occur, operating temperatures below sintering temperature are desired. For the production of ethylene polymers an operating temperature of from about 90° to 100° C. is preferably used to prepare products having a density of about 0.94 to 0.97 while a temperature of about 75° to 95° C. is preferred for products having a density of about 0.91 to 0.94.

Normally the fluid bed reactor is operated at pressures of up to about 80–110 psi for high density and 65–95 for low and medium density.

The catalyst is injected into the bed at a rate equal to its consumption at a point 32 which is above the distribution plate 22. A gas which is inert to the catalyst such as nitrogen or argon is used to carry the catalyst into the bed. Injecting the catalyst at a point above distribution plate 22 is an important feature. Since the catalysts normally used are highly active, injection into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably withdrawn at a point 34 at or close to distribution plate 22. The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone and after delivery, valve 38 is then closed to await the next product recovery operation.

Finally, the fluidized bed reactor is equipped with an adequate venting system to allow venting the bed during the start up and shut down. The reactor does not require the use of stirring means and/or wall scraping means.

The reactor vessel is normally constructed of carbon steel and is designed for the operating conditions stated above.

In order to better illustrate the problems incident to the utilization of the Type IV catalysts, reference is again made to the drawing. The titanium based catalyst (Type IV) is introduced into the reactor 10 at point 32. Under conventional operations on certain resins, after a period of time, sheets begin to form in reactor 10, at a site in the reactor proximate the wall of the reactor and located about a distance of one-half the reactor diameter up from the base of the fluid bed. The sheets of fused resin begin to appear in segregation zone 40, rapidly plugging the system, causing the reactor to be shut down. More characteristically the sheeting begins after production equivalent to 6 to 10 times the weight of the bed of resin in reactor 10.

Many possible causes were investigated in attempting to discover and eliminate the sheeting. In the course of the investigation, thermocouples were installed just inside the reactor walls at elevations of $\frac{1}{4}$ to $\frac{1}{2}$ reactor diameter above the gas distribution plate. Under conventional operations, "skin" thermocouples indicate temperatures equal to or slightly lower than the temperature of the fluidized bed. When sheeting occurs, these thermocouples may indicate temperature excursions of up to 20° C. above the temperature of the fluidized bed thus providing reliable indication of the occurrence of sheeting. In addition, an electrostatic voltmeter was used to measure voltage on a $\frac{1}{2}$ inch spherical electrode located in the fluid bed 1 inch radially from the reactor wall and usually 5 to 6 feet above the gas distributor plate. The location was selected because sheet formation was observed to initiate in a band ranging from $\frac{1}{4}$ to $\frac{3}{4}$ reactor diameter in elevation above the base of the fluid bed. As is well known for deep fluidized beds, this corresponds to the region of least mixing intensity near the wall, i.e., a null zone where particle motion near the wall changes from generally upward to generally downward. The possible causes investigated included factors affecting mixing in the fluidized bed, reactor operating conditions, catalyst and resin particle size, particle size distribution, and others. A correlation was found between sheeting and buildup of static electric charge on the resin particles proximate the reactor walls. When the static voltage level of resin particles at particular sites proximate the reactor wall in a fluidized bed reactor is low, the reactor runs normally and no sheets are formed. When the static voltage level exceeds a critical level at those sites, uncontrolled sheeting occurs and the reactor must be shut down.

It was further discovered that sheeting could be substantially reduced and in some cases entirely eliminated by controlling static voltage in the fluidized bed at a site proximate the reactor walls below the critical level for sheet formation. This critical level for sheet formation is not a fixed value, but is a complex function dependent on variables including resin sintering temperature, operating temperature, drag forces in the fluid bed, resin particle size distribution and recycle gas composition.

The critical voltage level Vc for sheeting of ethylene homopolymers, ethylene-butene and ethylene-hexene copolymers is primarily a function of the resin sintering temperature, the reactor bed temperature and the concentration of hydrogen in the recycle gas.

The sintering temperature of the resin under reactor operating conditions is the temperature at which a settled bed of resin in contact with a gas having the same composition as the reactor recycle gas used in producing the resin will sinter and form agglomerates when refluidization is attempted after allowing the bed to remain settled for fifteen minutes. The sintering temperature is decreased by decreasing the resin density, by increasing the melt index and by increasing the amount of dissolved monomers and monomer type.

The constants in the equation were determined from data collected during reactor operation when the reactor just began to exhibit sheeting symptoms through skin thermocouple temperature excursions above the bed temperature. The voltage indicated on the voltage probe described earlier varies with time due to the random nature of a fluidized bed. Thus the critical voltage, Vc, is expressed as a time averaged voltage. Voltage measurements are difficult to interpret because additional static electric charge is generated when a sheet, formed because of a static charge, separates from the reactor wall. In addition, the sheeting phenomena can start as a very local phenomenon and spread further clouding interpretation of voltage readings.

Although the sheeting mechanism is not fully understood, it is believed that static electricity generated in the fluid bed charges resin particles. When the charge on the particles reaches the level where the electrostatic forces trying to hold the charged particle near the reactor wall exceed the drag forces in the bed trying to move the particle away from the wall, a layer of catalyst containing, polymerizing resin particles forms a non-fluidized layer near the reactor wall. Heat removal from this layer is not sufficient to remove the heat of polymerization because the non-fluidized layer near the wall has less contact with the fluidizing gas than do particles in the fluidized portion of the bed. The heat of polymerization increased the temperature of the non-fluidized layer near the reactor wall until the particles melt and fuse. At this point other particles from the fluidized bed will stick to the fused layer and it will grow in size until it comes loose from the reactor wall. The separation of a dielectric from a conductor (the sheet from the reactor wall) is known to generate additional static electricity thus accelerating subsequent sheet formation.

The art teaches various processes whereby static voltage can be reduced or eliminated. These comprise (1) reducing the rate of charge generation, (2) increasing the rate of discharge of electrical charge, and (3) neutralization of electrical charge. Some processes suited for use in a fluidized bed comprise (1) use of an additive to increase the conductivity of the particles thus providing a path for discharging, (2) installation of grounding devices in a fluidized bed to provide additional area for discharging electrostatic charges to ground, (3) ionization of gas or particles by electrical discharge to generate ions to neutralize electrostatic charges on the particles, and (4) the use of radioactive sources to produce radiation that will create ions to neutralize electrostatic charges on the particles. The application of these techniques to a commercial scale, fluidized bed, polymerization reactor may not be feasible or practical. Any additive used must not act as a poison to the polymerization catalyst and must not adversely affect the quality of the product. It had been previously thought that water, the most widely used additive to reduce static on particles, cannot be used since it is a severe catalyst poison.

We have found however that in certain specific reactions, i.e., when Type IV and V catalysts with alkyl aluminum cocatalysts are used in the fluidized polymerization process that the addition of controlled minute quantities of water to the reactor dramatically reduces the incidence of sheeting without producing severe detrimental effects to the catalysts. The amount of water fed to the reactor depends on the static charges present in the reactor.

Water addition can be accomplished by a simple modification to the conventional procedures. Thus referring again to FIG. 1, an inert gas such as dry nitrogen from a nitrogen supply source, 41, is introduced into what is commonly referred to in the art an "O'Brien box" represented by FIG. 42. The O'Brien box generally contains one or more water tanks containing distilled water and is equipped with temperature and flow control means all of which are not shown. The nitrogen is bubbled through one of the water tanks which is a one liter stainless steel cylinder of distilled water in the temperature controlled housing. Water saturated nitrogen leaving the O'Brien box 42, through line 44, is then flow controlled through heat traced tubing to enter the olefin feed line such as ethylene feed line, 46, to the reaction cycle. Resultant water concentration in the ethylene is generally less than one part per million by volume. A moisture analyzer, 48, on the ethylene feed line 46 can be used for confirmation of water addition. A typical range for nitrogen flow control is about 0 to 11 lbs/hr for an ethylene feed range of 0 to 50,000 lbs/hr. With water cylinder temperature of 20° C. and 350 psig nitrogen a range of 0 to 0.3 ppm water is realized. Adjustments in water temperature or nitrogen pressure can permit varying this range to desired levels.

Merely as illustrative the following information shows the water add back flow to the reactor concentration calculations:

1. Determine vapor pressure of water at temperature in O'Brien box ($P_{H_2O}$).
2. Determine flow of nitrogen with integral orifice ($W_{N_2}$).
3. Determine nitrogen pressure from reactor bottom head pressure ($D_{N_2}$) plus the pressure drop in the line.
4. Determine ethylene flow to reactor ($W_{C_2H_4}$).
5. Assume nitrogen to be saturated with water:

$$\frac{P_{H_2O}}{P_{N_2}} \times W_{N_2} \times \frac{18}{28} = \text{Water flow } (W_{H_2O})$$

$$\frac{W_{H_2O}}{W_{C_2H_4}} \times \frac{28}{18} \times 10^6 = \text{PPM H}_2\text{O in ethylene feed}$$

At 20° C. $P_{H_2O} = 0.339$ psia
$P_{N_2} = 325$ psia when reactor at 300 psig.
$W_{N_2} = 0$ to 11.36 ppm typically flow at 3 ppm
$W_{C_2H_4} = 18,000$ pph $$\text{Water concentration} = \frac{(.339)}{325} \frac{(3)(10)}{18,000} = 0.174 \text{ ppm}$$

Static voltage in the reactor can be monitored near the reactor wall by one or more static voltage indicators 50 inserted into the reactor bed approximately five feet above the distributor plate in the range of −15,000 to +15,000 volts. With reaction in progress, changes in static voltage levels from neutral to positive can be counteracted by feed of the moisture laden nitrogen to the ethylene stream. If this is not performed, impending agglomerate formation will likely create a process upset. Care must be exercised to avoid excessive water levels which can result in unwanted negative static voltage levels.

The system is operated with various flow and check valves which are common in the art and hence not illustrated. In addition, line 44 is preferably insulated and steam traced prior to entering the gas feed line 46.

The polymers to which the present invention is primarily directed and which cause the sheeting problems above referred to in the presence of titanium catalysts are linear homopolymers of ethylene or linear copolymers of a major mol percent ($\geq 90\%$) of ethylene, and a minor mol percent ($\leq 10\%$) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1, 4-methylpentene-1, heptene-1, and octene-1. This description is not intended to exclude the use of this invention with alpha olefin homopolymer and copolymer resins in which ethylene is not a monomer.

The homopolymers and copolymers have a density ranging from about 0.97 to 0.91. The density of the copolymer, at a given melt index level is primarily regulated by the amount of the $C_3$ to $C_8$ comonomer which is copolymerized with the ethylene. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions. In the absence of the comonomer, the ethylene would homopolymerize.

The melt index of a homopolymer or copolymer is a reflection of its molecular weight.

Polymers having a relatively high molecular weight, have relatively high viscosities and low melt index.

In a typical mode of utilizing the subject invention to reduce sheeting, a reactor vessel such as shown in FIG. 1 and which is susceptible to sheeting problems by the polymerization of the above described materials utilizing Type IV and Type V catalysts with an alkyl aluminum cocatalyst is partially filled with granular polyethylene resin which is purged with a non-reactive gas such as nitrogen and is fluidized by circulating said non-reacting gas through the reactor at a velocity above the minimum fluidizing velocity (Gmf) of the granular polyethylene and preferably at 3 to 5 Gmf. The reactor is brought up to operational temperatures by the gas and the reaction is started by introducing the catalyst and cocatalyst to the reactor. During reaction, static voltage levels approach those levels which cause sheeting, then the pressure, temperature and flow control in the O'Brien box are increased to permit nitrogen to become water saturated. The water saturated nitrogen is then directed to the gas feed line and introduced into the reactor. The voltage levels in the reactor are monitored responsive to the water laden gas feed stream and the procedure is continued until the static voltage levels are brought to levels of non-sheeting.

Having set forth the general nature of the invention, the following examples illustrate some specific embodiments of the invention. It is to be understood, however, that this invention is not limited to the examples, since the invention may be practiced by the use of various modifications.

Examples 1 and 2 were conducted in a conventional bed reactor. The catalyst used was a Ziegler type, titanium based catalyst supported on porous silica produced as described earlier as Type IV. The cocatalyst used was triethyl aluminum. The products made in the examples were copolymers of ethylene and 1-butene. Hydrogen was used as a chain transfer agent to control the melt index of the polymer.

EXAMPLE 1

A fluidized bed reactor was started up at operating conditions designed to produce a film grade low density ethylene copolymer product having a density of 0.918, a melt index of 1.0, and a sticking temperature of 104° C. The reaction was started by feeding catalyst to the reactor precharged with a bed of granular resin similar to the product to be made. The catalyst was a mixture of 5.5 parts titanium tetrachloride, 8.5 parts magnesium chloride and 14 parts tetrahydrofuran deposited on 100 parts Davison grade 955 silica which had been dehydrated at 600° C. and treated with four parts triethylaluminum prior to deposition and was activated with thirty-five parts tri-n-hexyl aluminum subsequent to deposition. Prior to starting catalyst feed, the reactor and resin bed were brought up to the operating temperature of 85° C., were purged of impurities by circulating nitrogen through the resin bed. Ethylene, butene and hydrogen concentrations were established at 53, 24, and 11%, respectively. Cocatalyst was fed at a rate of 0.3 parts triethylaluminum per part of catalyst.

Reactor start-up was normal. After producing product for twenty-nine hours and equivalent to 6½ times the weight of the fluidized bed, temperature excursions of 1 to 2° C. above bed temperature were observed using thermocouples located just inside the reactor wall at an elevation of ½ reactor diameter above the gas distributor plate. Prior experience had shown that such temperature excursions are a positive indication that sheets of resin are being formed in the fluidized bed. Concurrently, bed voltage (measured using an electrostatic voltmeter connected to a ½ inch diameter spherical electrode located one inch from the reactor wall at an elevation of ½ reactor diameter above the gas distributor plate) increased from a reading of approximately +1500 to +2000 volts to a reading of over +5000 volts and then dropped back to +2000 volts over a 3 minute period. Temperature and voltage excursions continued for approximately 12 hours and increased in frequency and magnitude. During this period, sheets of fused polyethylene resin began to show up in the resin product. Evidence of sheeting became more sever, i.e., temperature excursions increased to as high as 20° C. above bed temperature and stayed high for extended periods of time and voltage excursions also became more frequent. The reactor was shut down because of the extent of sheeting.

EXAMPLE 2

The fluidized bed reactor used in Example 1 was started up and operated to produce a linear low density ethylene copolymer suitable for extrusion or rotational molding and having a density of 0.934, a melt index of 5 and a sticking temperature of 118° C. The reaction was started by feeding catalyst similar to the catalyst in Example 1 except activated with 28 parts tri-n-hexylaluminum, to the reactor precharged with a bed of granular resin similar to the product to be made. Prior to starting catalyst feed the reactor and the resin bed were brought up to the operating temperature of 85° C., and were purged of impurities with nitrogen. The concentration of ethylene (52%), butene (14%), hydrogen (21%) were introduced into the reactor. Cocatalyst triethylaluminum was fed at 0.3 parts per part of catalyst. The reactor was operated continuously for 48 hours and during that period produced resin equivalent to 9 times the amount of resin contained in the bed. After this 48 hour period of smooth operation, sheets of fused resin began to come out of the reactor with the normal, granular product. At this time voltages measured ½ reactor diameter above the distributor plate averaged +2000 volts and ranged from 0 to +10,000 volts, while the skin thermocouples at the same elevation indicated excursions of >15° C. above the bed temperature. Two hours after the first sheets were noted in the product from the reactor, it was necessary to stop feeding catalyst and cocatalyst to the reactor to reduce the resin production rate because sheets were plugging the resin discharge system. One hour later, catalyst and cocatalyst feeds were restarted. The production of sheets continued and after two hours catalyst and cocatalyst feed were again stopped and the reaction was terminated by injecting carbon monoxide. The voltage at this time was >+12,000 volts and the thermocouple excursions continued until the poison was injected. In total, the reactor was operated for 53 hours and produced 10½ bed volumes of resin before the reaction was stopped due to sheeting.

The following Example illustrates the prevention of sheeting by adding water to the gas feed during periods of high voltage in the reactor.

EXAMPLE 3

The reactor of Examples 1 and 2 were modified as shown in FIG. 1 and a high density film grade polyethylene resin of 0.946 density, 7.5 flow index, and sticking temperature of 124° C. was continuously produced. The product was an ethylene-hexene copolymer utilizing a vanadium based catalyst with an aluminum alkyl cocatalyst and halogen promoter for polymerization. The catalyst contained 0.29 millimoles vanadium per gram of precursor and 1.2% aluminum added in the form of diethylaluminum chloride on a Davison silica support of 30–130 micron size. Reaction proceeded with a bed temperature of 98° C., 76% ethylene, 1.6% hydrogen, 1.2% hexene, and the remaining concentration inert gases of nitrogen, methane, isopentane, etc. under a reactor pressure of 315 psia. Cocatalyst was controlled by feeding triethylaluminum to maintain 200 ppmv in the resin produced. Freon was fed as a promoter to maintain a ratio of 0.7 moles freon to each mole of teal. Production rate was sustained at approximately 20,000 pph or a space time yield of 5 mlbs/hr/ft$^3$ of bed volume.

During production gradual increase in static voltage levels measured 5 ft above the distributor plate at the reactor wall began about 18 hours after stable production was achieved. Voltage build up appeared with small static spikes from 0 to 100–300 volts every 1 to 5 minutes. The trend continued upward with a base line shift from 0 to 1000–5000 volts and static spikes to 10,000–15,000 volts with an increasing frequency. Associated with the static were deviations in skin temperatures measured 3 to 6 ft above the distributor plate at the reactor wall. These deviations were generally negative indicating an insulating effect due to resin accumulation adhered to the wall. If allowed to continue sheet formation will occur eventually leading to a reactor shutdown from plugged discharge systems or blockage at the distributor plate resulting in a large agglomerate formation due to loss of fluidization.

At this point water was added by establishing approximately 5 pounds per hour nitrogen feed through the cylinder containing distilled water at 20° C. and 350 psig to the ethylene feed line to the reactor. Resultant water concentration in the ethylene feed was 0.2 ppmv. Adjustments were made to control the static level near zero. Care was exercised to avoid excessive water feed which can result in unwanted negative static excursions which can also lead to a sheeting incident.

The static level was brought to control near zero and sheet formation was avoided and stable reactor operation was maintained without unwanted shutdowns from sheeting incidents.

EXAMPLE 4

The modified reactor of Example 3 was utilized to produce a linear low density film resin. The resin produced was a 0.917 density, 2.7 melt index ethylene-hexene copolymer with a sticking temperature of 102° C. The catalyst used was a titanium based on a silica support. Loading of titanium was 0.25 millimoles per gram of precursor. Magnesium chloride, diethylaluminum chloride, and tri-normal hexylaluminum were added in molar ratios of 3, 0.02, 0.02 respectively to the titanium content. Silica support was Davison 955 with a micron size range of 10–80. Reaction is proceeded with a bed temperature of 76° C., 29% ethylene, 11% hydrogen, 5% 1-hexene, and the remaining concentrations inert nitrogen, ethane, methane, and isopentane. Cocatalyst was fed to control 300 ppmw triethylaluminum in the resin. Catalyst productivity under these conditions was 2200 pounds of polyethylene produced per pound of catalyst. Production rates were 18,000 pounds per hour or 4.5 space time yield.

A sudden increase in ethylene concentration resulted in a pronounced increase in catalyst activity. Static voltage near the reactor wall increased from near zero to 6000 volts over a ten minute period. Skin temperatures at the wall show an increase indicating the sudden formation of polymer sheets along the wall of the reactor at the 6 ft level above the distribution plate. If allowed to continue, a reactor shutdown was imminent due to plugged product discharge systems.

Water add back was begun with nitrogen flow of 4 pph through the water cylinder in the temperature controlled housing at 20° C. Resultant water concentration in the ethylene was less than 0.2 ppm. Static voltage quickly returned to near zero. Reactor skin temperature deviations subsided within ten minutes and normal reactor production resumed.

What is claimed is:

1. A method for reducing sheeting during polymerization of alpha-olefins in a low pressure fluidized bed reactor utilizing titanium or vanadium based compounds as catalysts together with alkyl aluminum cocatalysts which comprises introducing water into said reactor in an amount sufficient to maintain the electrostatic levels at the site of possible sheet formation at levels which avoid sheeting without substantially altering the effectiveness of said catalysts.

2. A method according to claim 1, wherein one of said alpha-olefins is ethylene.

3. A method according to claim 2 wherein said water is introduced into said reactor by passing a pressurized inert gas at a controlled rate of flow through a temperature controlled container containing water to add water to said inert gas, directing said inert gas containing water from said temperature controlled container into admixture with said ethylene and thereafter introducing said admixture into said reactor.

4. A method according to claim 3 wherein said inert gas is nitrogen.

5. A method according to claim 4 wherein the flow rate of said nitrogen gas the flow rate of said ethylene, and the temperature of said water in said container are controlled and are determined responsive to static levels in said reactor.

6. A method according to claim 5 wherein the water content in said admixture entering said reactor is less than one part per million by volume based on said ethylene feed.

7. A method according to claim 5 wherein the water content in said admixture entering said reactor is about 0.1 to about 2 parts per million by volume based on said ethylene feed.

8. A method according to claim 5 wherein the flow rate of said nitrogen is varied between 0 to 11 lbs/hr for an ethylene feed range of about 0 to 50,000 lbs/hr.

9. A method for reducing sheeting during production of polyolefins by polymerization of alpha-olefins in a low pressure fluidized bed reactor utilizing titanium or vanadium based compounds as catalysts together with alkyl aluminum cocatalysts which comprises introducing water into said reactor said water being introduced into said reactor by passing a pressurized inert gas at a controlled rate of flow through a temperature controlled container containing water to add water to said inert gas, directing said inert gas containing water from said temperature controlled container into admixture with said alpha-olefins and thereafter introducing said admixture into said reactor, said water being introduced into said reactor in an amount sufficient to maintain the electrostatic levels at the site of possible sheet formation at levels which avoid sheeting without substantially altering the effectiveness of said catalysts.

10. A method according to claim 9 wherein said inert gas is nitrogen.

11. A method according to claim 10 wherein the flow rate of said nitrogen gas, the flow rate of said alpha-olefins and the temperature of said water in said container are controlled and are adjusted responsive to static levels in said reactor.

12. A method according to claim 9 wherein the water content in said admixture entering said reactor is less than one part per million by volume based on said ethylene feed.

13. A method according to claim 9 wherein the water content in said admixture entering said reactor is about 0.1 to 2 parts per million by volume based on said ethylene feed.

14. A method according to claim 10 wherein the flow rate of said nitrogen is varied between about 0 to 11 lbs/hr for an alpha-olefin feed range of about 0 to 50,000 lbs/hr.

15. A method according to claim 9 wherein the temperature of said water in said container is controlled within the range of about 10° C. to 40° C.

16. A method according to claim 9 wherein said polyolefins are linear homopolymers of ethylene or linear copolymers of a major mole percent ($\geq 90\%$) of ethylene, and a minor mole percent ($\leq 10\%$) of one or more $C_3$ to $C_8$ alpha-olefins.

17. A method according to claim 16 wherein said polyolefins are homopolymers or copolymers of propylene, butene-1, pentene-1, hexene-1, 4-methylpentene-1, heptene-1, or octene-1.

18. A method for reducing sheeting during production of polyolefins by polymerization of alpha-olefins in a low pressure fluidized bed reactor utilizing titanium or vanadium based compounds as catalysts together with alkyl aluminum cocatalysts which comprises introducing water into said reactor said water being introduced into said reactor by passing a pressurized nitrogen gas at a flow rate of about 0 to 11 lbs/hr. for an alpha-olefin feed rate of about 0 to 50,000 lbs/hr. through a temperature controlled container containing water at a temperature of about 10° C. to 40° C. to add water to said nitrogen gas, directing said nitrogen gas containing water from said temperature controlled container into admixture with said alpha-olefins and thereafter introducing said admixture into said reactor, said water being introduced into said reactor in an amount of about less than one part per million by volume based on said ethylene feed.

19. A method according to claim 18 wherein the flow rate of said nitrogen gas, the flow rate of said alpha-olefins and the temperature of said water in said container are controlled and are adjusted responsive to static levels in said reactor.

20. A method according to claim 18 wherein the water content in said admixture entering said reactor is no less than about 0.1 part per million by volume based on said ethylene feed.

21. A method according to claim 18 wherein said polyolefins are linear homopolymers of ethylene or linear copolymers of a major mole percent ($\geq 90\%$) of ethylene, and a minor mole percent ($< 10\%$) of one or more $C_3$ to $C_8$ alpha-olefins.

22. A method according to claim 21 wherein said polyolefins are homopolymers or copolymers of propylene, butene-1, pentene-1, hexene-1, 4-methylpentene-1, heptene-1, or octene-1.

* * * * *